Aug. 19, 1952  O. S. TUTTLE  2,607,447
FASTENER

Filed Feb. 26, 1946  2 SHEETS—SHEET 1

INVENTOR.
ORVIL S. TUTTLE
BY James M. Heitman
Att'y.

Aug. 19, 1952     O. S. TUTTLE     2,607,447
FASTENER

Filed Feb. 26, 1946     2 SHEETS—SHEET 2

INVENTOR.
ORVIL S. TUTTLE
BY James M. Heilman,
Att'y.

Patented Aug. 19, 1952

2,607,447

UNITED STATES PATENT OFFICE 2,607,447

FASTENER

Orvil S. Tuttle, New Rochelle, N. Y., assignor to United States Plywood Corporation, New York, N. Y., a corporation of New York Application February 26, 1946, Serial No. 650,212

3 Claims. (Cl. 189—34)

One of the objects of this invention is to provide fastening means whereby two elements or two assemblies of elements may be secured together without damage to either element or either assembly by reason of the pressure applied by the fastening means.

Another of the objects of this invention is to provide means whereby one or more members comprised of at least one element of light weight or low density may be secured together without damage to the element of light weight.

A further object of this invention is to provide means to secure a laminated material to a structural beam or support, said laminated material having one or more laminations susceptible of being deformed by high pressure.

A still further object of this invention is to provide means whereby a light density material, such as, a "honeycomb" or corrugated core material, foamed resin material, cellular cellulose acetate, insulating material, fiber board material, etc., either alone or with one or two faces thereon, may be attached to a structural support and may have other elements secured to it.

A further object of this invention is to provide a simple fastening means which will not tend to pull through the material of light density when the material is attached to other objects.

Another object of this invention is to provide a spacer bushing or reenforcing bearing plug which may be located in the field and which reenforcing bearing plug will itself be strong enough to support the rivet or bolt laterally even though the material in which the bearing plug is positioned would be unable alone to support the shank of the rivet during the riveting operation.

Other and further objects will appear from a reading of the specification.

With the foregoing and other objects in view, the invention resides in the novel arrangement and combination of parts and in the details of construction and process of manufacture hereinafter described and claimed, it being understood that changes in the precise embodiment of the invention herein described may be made within the scope of what is claimed without departing from the spirit of the invention. It will be further understood that my invention is susceptible of embodiment in many and various forms, some of which are illustrated in the accompanying drawing, and that the structural details or particular steps of the method herein set forth may be varied to suit particular purposes and still remain within my inventive concept.

Referring to the figures.

Figure 1:
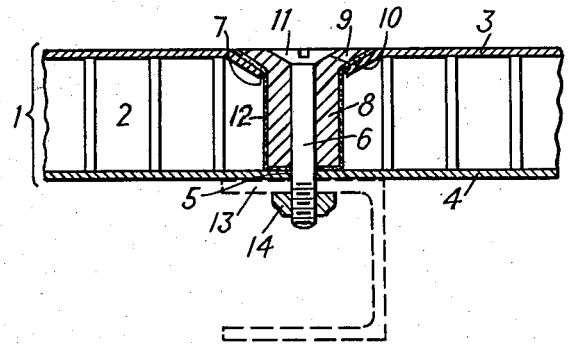
Fig. 1 is a partial cross-sectional view illustrating one method of attaching a light-weight or low density material to another object.

Many commercial fields of activity are interested in materials of light weight or low density. This is particularly true in the transportation field wherein manufacturers of airplanes, railroads, trucks, buses, ships, boats, etc., are interested in the lightest material per unit weight for floors, bodies, partitions, walls, tables, seats, and other equipment, etc. However, the fastener is adapted to be used with material of light density wherever used. Contractors of large buildings might be interested in using light density material so that the foundations would not need to be so massive and expensive.

In the use of light-weight material or material of light density, it has always been a problem to attach this material to other material or to a supporting structure. On the other hand, it has also been a problem to attach to the light-weight material other objects to be supported thereby. The field of this invention is more generally to "honeycomb" material, balsa wood, thin corrugated material, such as, wood veneer, resin impregnated paper, corrugated plywood, asbestos board, "Celotex," hardboard, foamed resin material, cellular cellulose acetate, etc. In fact, this invention may be used in connection with any cellulosic, vegetable, animal or mineral fiber either impregnated with a resin or equivalent or unimpregnated. The specific application of the invention is to an expanded, light density material, but the invention can also be applied to an unexpanded body. The fastener may be used either with the material alone, but preferably is used with a laminated or composite material, namely, when the core material has one or more faces, such as, aluminum, magnesium, wood veneer, plywood, plastic laminates, thin gauge steel sheet, etc.

"Honeycomb" material normally comprises a series of sheets of paper, fabric, or fiberglass, which have been impregnated with any of the well known resins or solutions of these resins, such as, phenol formaldehyde, phenol furfural, urea formaldehyde, melamine, polyester, vinyl, styrene, or any of the other common synthetic resins. These sheets are then formed by corrugation or accordion-like expansion into a material which closely resembles a honeycomb in appearance. This material while very strong per unit weight is, nevertheless, susceptible of being injured or damaged due to its low density. For example, a typical "honeycomb" core material faced with an aluminum face .012 inch thick on both sides weighs only .615 pound per square foot.

In the past it has been the custom to drill a hole through the laminated construction and then insert a bolt through the hole. By means of a nut, the panel is attached to a second object. However, due to the low density of the material, workmen, in assembling the two objects, frequently bend the faces and pull the head of the bolt, and the washer if used, through a hole which is forced in the material. If a hole is not made at the time of assembling the two objects, subsequent stresses will frequently disengage the two objects. It has been proposed also to insert apertured blocks of wood at spaced, predetermined distances in the core material when the material is manufactured. The apertures then receive a fastening bolt. However, this is an expensive procedure inasmuch as location marks must be used and even so it is practically impossible to match the center of the block with the object to which it is to be attached. In both of the foregoing constructions, the head of the bolt, as well as the washer, if used, project above the face and create a dangerous obstruction as well as mar the surface.

My invention provides a simple method of eliminating these prior difficulties. In addition, instead of weakening the structure, my invention strengthens the structure as a whole. Also, my fastener is foolproof, in that the panel cannot be damaged by the average careless worker irrespective of the amount of pressure he applies to the nut.

Another difficulty avoided by my invention is the damage to the surface of the board, whether of one piece or laminated construction, when wood or similar material is used as one of the elements. Wood is comparatively soft and swells and shrinks with moisture changes. Hence, if the nut is pulled tight when the wood element is dry, the head of the bolt will be pulled into the surface of the panel when the wood element swells. Likewise, if the nut is applied when the wood or synthetic wood had a normal or abnormal amount of moisture present, the connection will be loose when the board becomes dry.

Fig. 1 illustrates a "honeycomb" sandwich material, such as, a floor or wall panel secured to a structural member, such as, a channel or U-shaped beam. Numeral 1 indicates a "honeycomb" sandwich or laminated material comprising a "honeycomb" core 2 or other low density core material having wood or metal faces, such as, aluminum 3 and 4 applied thereto. At the place where it is desired to attach the panel to a support, a hole 7 is drilled through face 3 and core material 2, but not through face 4. This hole should be large enough after drilling and dimpling or spinning to allow for countersinking the head or flaring mouth 9 of the spacer bushing and to allow the body or the shank of the spacer bushing or reenforcing bearing plug 8 to pass therethrough. The center of the bushing 8 may serve, if desired, as a locating device for locating and holding the drill while the bottom hole 5 is drilled. These holes may be drilled with an ordinary drill, and the surface or skin can be dimpled or spun by any of the conventional methods or the spacer bushing itself may be pressed into position thus dimpling the top skin. Obviously, the drilling through the core and through the faces as well as forming a seat for the flaring mouth of the bushing may be accomplished in one operation.

If a flush type construction is desired, the inside of the flaring mouth 9 may be recessed as shown at 10 to receive the head 11 of the bolt 6. The article 13 to which the panel 1 is to be attached, or which it is desired to attach to the panel 1, is secured by means of stop nut or lock nut 14.

If desired, the spacer bushing may have applied to its outer surface, except to the exposed top surface, a thin film of adhesive 12 of any of the adhesives which will cement metal to other materials. The bushing thus becomes an integral part of the sandwich and has the following advantages:

(1) Eliminates weakening due to stress concentration around a hole in thin material.

(2) Eliminates weakening due to the hole cut out as the reenforcement provided by the bushing plug more than offsets for the loss of strength due to the area cut out.

(3) Reenforces lower hole 5 by end of bushing and distributes load into lower skin through shear area of contact in addition to bearing of bolt on lower skin.

(4) Reenforces upper surface since the bearing area is increased from the cross-sectional area of the bolt 6 to the cross-sectional area of the mouth 9 of the bushing, and further reenforces upper surface by distributing load into top surface by shear over cemented area of mouth.

(5) Reenforces by cementing of body of bushing 8 so that a portion of the load will be distributed to the core material.

In addition to all the foregoing advantages, the adhesive completely seals the interior and protects it against moisture and subsequent deterioration of the resin, carrier, and inside rusting of sheet steel if used. Another important advantage, particularly in pressurized fuselages and air conditioned houses, is that the adhesive provides air tight joints and fittings and, hence, a dead air space.

As can be seen, as the lock nut 14 is tightened, it bears against the lower end of bushing 8 and securely fastens any object, such as, channel beam 13 to the panel but cannot damage the core material 2 because of the presence of the bushing 8. The strength of the connection is thereby changed from the strength of the core material to the limiting strength of the bolt itself. Obviously, this strength can be increased by increasing the size of the bushing and the size of the bolt to any value which may be considered desirable. Likewise, the size of body of the bushing may remain the same and the flaring mouth may be greatly extended or a separate washer, tapered at its inner end, may be inserted between the flaring mouth of the bushing and the face 3 or core 2.

Figure 2:
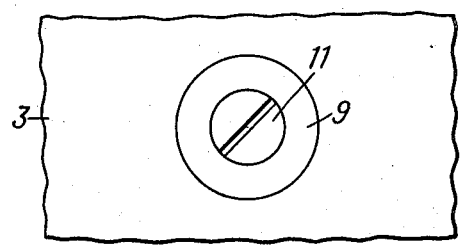
Fig. 2 is a plan view of the fastening means illustrated in Fig. 1.

In Figs. 1 and 2 a flush construction is provided so that the fastening means become practically invisible, and if used as a floor construction, can be covered with thin linoleum or thin carpet without the end of the bolt showing through, thereby presenting a fine appearance at the same time saving wear on the carpeting.

Figure 3:
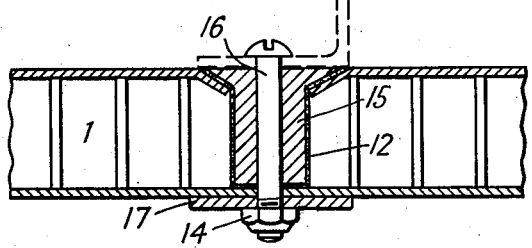
Fig. 3 is a partial cross-sectional view of a different modification of my invention for nonflush type assembly.

The modification shown in Fig. 3 is adapted to be used where a flush construction is not necessary, or where it is desired to attach something on the upper surface. The bushing 15 as used in this construction does not have, necessarily, a recessed head. Any object, such as, angle 13' to be attached to the panel 1 is secured by means of bolt 16. This modification would be desirable where there is an upward stress in the panel such as would occur in attaching seats to the flooring of an airplane, railroad car, etc. An enlarged bearing surface on the lower side of the panel could be provided by use of a washer 17 or a continuous bearing strip between successive attachments. In other words, instead of a washer 17, an elongated bearing strip could be substituted so that the stress at any point can be equalized over a multitude of bolts and bushings by means of a bearing strip.

Figure 4:
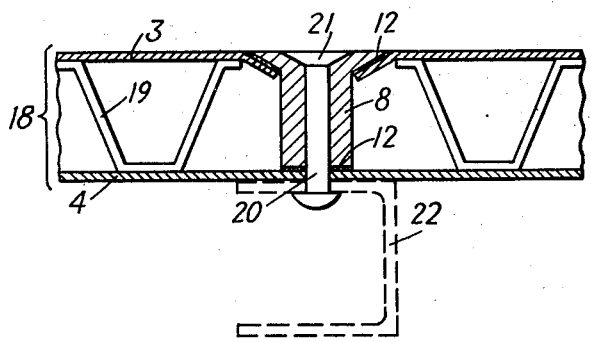
Fig. 4 illustrates a still further modification of my invention, showing a rivet instead of a bolt as the attaching means.

Fig. 4 shows a third modification of my invention in which the panel 18 comprises a core element 19 of corrugated material, corrugated veneer, corrugated plywood, corrugated metal, or any other corrugated material, such as, a resin impregnated paper having faces 3 and 4 applied thereto. In place of a bolt, in this modification a rivet 20 is inserted into the bushing 8. Rivet 20 has a conventional head 21, and when set will retain article 22 securely attached to the panel 18. If desired, a bolt could be used in this modification and, likewise, a rivet could be used in Figs. 1 and 3. The adhesive 12 may be dispensed with entirely if so desired. Obviously, since the side of the bushing does not contact anything, no adhesive will be used on the side.

Figure 5:
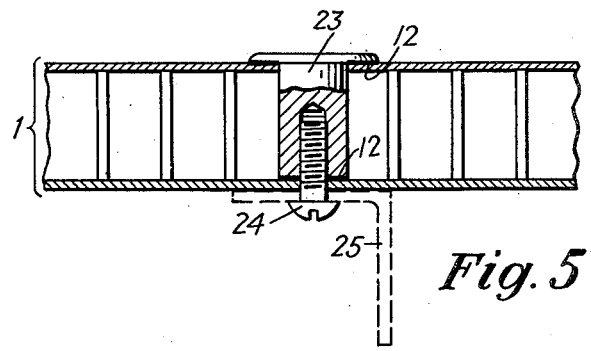
Fig. 5 is another modification showing a threaded bushing for receiving a machine screw directly.

Fig. 5 illustrates another modification of my invention wherein the bushing 23 has an extending mouth or lip at one end and is threaded at the other end to receive a machine screw 24 and thus hold an object 25 attached to panel 1. For greater reenforcement, adhesive 12 may be applied to the underside of the mouth and the contacting area of the body of the bushing.

I have described my invention in connection with a panel for flooring, but this fastener is susceptible of many uses. For example, in the construction of present day hollow core doors, four wooden blocks must be inserted in the doors to provide for the subsequent attachment of hardware to the door, depending on which side the door is hinged to the frame and which end becomes the top or the bottom of the door. With my invention, these four blocks could be eliminated, and by a simple drilling operation, a substantial support for the door knob could be obtained at the time the door is hung. Many other uses are clearly apparent, such as, in prefabricated houses, trailers, permanent large buildings, shipping containers, etc.

Figure 6:
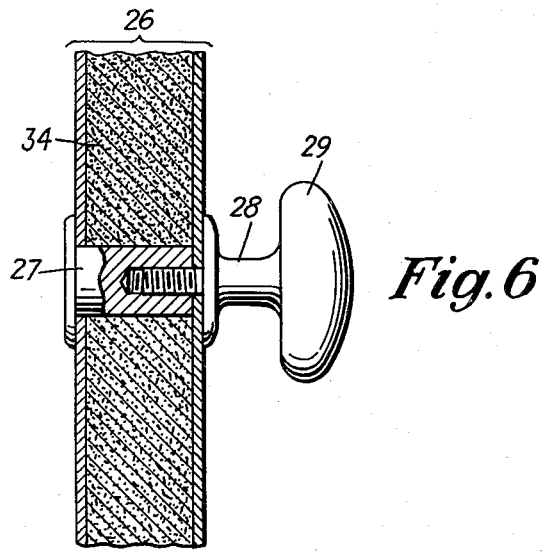
Fig. 6 illustrates a bushing similar to the one illustrated in Fig. 5, but with a door knob replacing the screw.

Fig. 6 illustrates my invention applied to a door in which bushing 27 is similar to bushing 23, but may be appropriately decorated on the exterior surface of the mouth. A threaded spindle 28 having an enlarged end or knob 29 is screwed into the bushing 27. This bushing may be inserted into any hollow core or solid core door, but is primarily designed to be used in a door of low density material with or without facing elements. For purposes of illustration, panel or door 26 is illustrated as having a core 34 of cellulose acetate or insulating material and having faces applied thereto.

Figure 7:
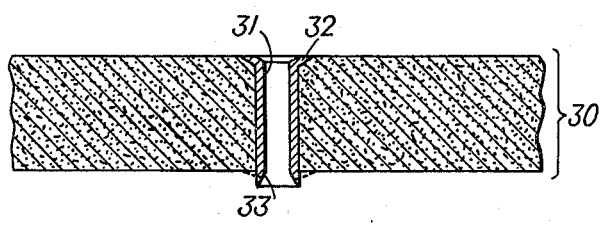
Fig. 7 shows a thin bushing similar to Figs. 1 and 4, but with a narrow enlarged lip and an extending foot adapted to be swaged against the outer side of the face.

Fig. 7 illustrates a modified form of bushing. When it is desired to position the fastener close to the sides or ends of the panel, there may not be room for a thick bushing and enlarged mouth as shown at 8, 9 in Figs. 1 and 3. Thus, Fig. 7 illustrates a bushing 31 through a panel of low density material 30 and having a narrow lip 32 overhanging the recessed surface of the panel. The lip 32 is recessed similarly to mouth 9 to receive the head of a bolt or rivet. Another feature illustrated in this figure is the extending foot 33 which may be swaged over to secure the bushing directly to the lower surface of the panel.

It is of course obvious that the reenforcing bushings or supporting elements 8 and 15 in Figs. 1 and 3 could be provided with a stepped recess at its end and have a narrow extending foot, similar to foot 33. A slightly enlarged aperture would be formed in face 4 so that the foot could extend therethrough. When the foot is swaged over, the face 4 of the panel is securely clamped in the stepped recess between the swaged foot and the main body of the bushing. The recess and foot, as well as the main body of the bushing, may have cement applied thereto if so desired.

It is preferred that the bushing be made of metal, such as, aluminum, or be made of "Tempreg," which is a phenol impregnated paper laminate, or other paper or fabric reenforced plastic laminate.

Thus it can be seen that I have invented a reenforcing fastening and supporting element for light density material, either alone or faced with metal, wood, plastic, glass, or fabric, on one or both sides. The faces may also be comprised of laminations of the above materials or equivalent materials or various desirable combinations of the above materials or equivalent materials. For example, the upper face may be a combination metal-veneer face, while the lower face may be an impregnated paper or fabric face, such as, flannel, rayon, nylon, canvas, etc. This fastening element is foolproof in the assembly operation, is simple in construction, has enormous shear strength, and can be used interchangeably for upward acting or downward acting stresses.

The apertures in the material may be drilled or spin dimpled as the assembly proceeds, and accomplished at the exact spot where the partition, seat, cable, strut, support, etc. can be attached most advantageously. No expensive prelocation of aperture and aperture supports or bushing is necessary. As reenforcing bushing plug may be located in the field or on the job, it is not necessary to prelocate point of attachment as is required when wood block inserts are placed in the core material. Therefore, the necessity for blue prints with blocks marked thereon so that the average workman can locate the blocks is eliminated. Standard size panels may be cut to fit any job without worrying about points of attachment, etc.

Dangerous and/or unsightly projecting bolt heads and washers are eliminated, and a flush type fastener is provided which prevents tripping, saves carpets, and lends itself readily to having an additional face fitted flush with the "honeycomb" or other low density material. The pressure applied by the lock nut in one direction is counteracted by and compensated for by the reaction of the bushing in the directly opposite direction. Hence, all directional stress is equalized.

Normally it is impossible to rivet through low density material even though the faces may be heavy enough to support the head of the rivet. This is so because the low density material gives insufficient lateral support and the body of the rivet will bend into the low density core material and will prevent a tight structural rivet. In my bushing, the rivet will always be tight because the body of the bushing will support the shank of the rivet and permit the rivet to be driven tight.

What I claim is:

1. The combination of a reinforcing fastener and a laminated construction having a core of honeycomb material providing a substantially thick layer of low density and first and second faces of material providing thinner layers of greater density, said core material and both of said faces each having an aperture therethrough, all of which apertures are in substantial alignment, the material of said first face in the region surrounding the aperture therein forming a depression, said fastener comprising a bushing having a flared head portion of greater diameter than said first face aperture and a shank portion of greater diameter than said second face aperture, said bushing being positioned with said shank portion extending through both said core aperture and said first face aperture, with said flared head portion seated in said depression in the outer surface of said face, and the extremity of said shank portion remote from said head portion abutting the inner surface of said second face, an adhesive between the outer surface of said bushing and the surfaces of said faces and core where said bushing is in contact with each of the latter, bolt means extending completely through said bushing and having a head portion seated in said flared head portion of said bushing and a remote extremity thereof protruding through said second face aperture, clamping means on said protruding extremity, and a flat surfaced element clamped between said clamping means and the outer surface of said second face and in surface abutment with the latter.

2. The combination of a reinforcing fastener and a laminated construction having a core of honeycomb material providing a substantially thick layer of flow density, and first and second faces of material providing thinner layers of greater density, said core material and both of said faces each having an aperture therethrough, all of which apertures are in substantial alignment, the material of said first face forming a depression in the region surrounding the aperture therein, said fastener comprising a bushing having a flared head portion of greater diameter than said first face aperture, a depression in said head portion and a shank portion of greater diameter than said second face aperture, said bushing being positioned with said shank portion extending through both said core aperture and said first face aperture, with said flared head portion seated in the depression in the outer surface of said face, and the extremity of said shank portion remote from said head portion abutting the inner surface of said second face, an adhesive between the outer surface of said bushing and the surfaces of said faces and core where said bushing is in contact with each of the latter, bolt means extending completely through said bushing and having a head portion seated in said depression in said flared head portion of said bushing and a remote extremity thereof protruding through said second face aperture, clamping means on said protruding extremity, and a flat surfaced element clamped between said clamping means and the outer surface of said second face and in surface abutment with the latter.

3. The combination of a reinforcing fastener and a laminated construction having a core of expanded material providing a substantially thick layer of low density, and first and second faces of solid material providing thinner layers of greater density, said core material and both of said faces each having an aperture therethrough, all of which apertures are in substantial alignment, the material of said first face forming a depression in the region surrounding the aperture therein, said fastener comprising a bushing having a flared head portion of greater diameter than said first face aperture and a shank portion of greater diameter than said second face aperture, said bushing being positioned with said shank portion extending through both said core aperture and said first face aperture, with said flared head portion seated in the depression in the outer surface of said face, and the extremity of said shank portion remote from said head portion abutting the inner surface of said second face, an adhesive between the outer surface of said bushing and the surfaces of said faces and core where said bushing is in contact with each of the latter, bolt means extending completely through said bushing and having a head portion protruding from said flared head portion of said bushing and a remote extremity thereof protruding through said second face aperture, clamping means on said protruding extremity, and a flat surfaced element clamped between said clamping means and the outer surface of said second face and in surface abutment with the latter.

ORVIL S. TUTTLE.

REFERENCES CITED

The following references are of record in the file of this patent:

UNITED STATES PATENTS

| Number | Name | Date |
|---|---|---|
| 600,849 | Brown | Mar. 15, 1898 |
| 648,632 | Parker | May 1, 1900 |
| 1,832,903 | Holbrook | Nov. 24, 1931 |
| 1,872,014 | Schjolin | Aug. 16, 1932 |
| 1,898,417 | Woehler | Feb. 21, 1933 |
| 1,962,035 | Reiter | June 5, 1934 |
| 1,998,936 | Luce | Apr. 23, 1935 |
| 2,059,318 | De Merce | Nov. 3, 1936 |
| 2,083,956 | Lang | June 15, 1937 |
| 2,086,503 | King | July 6, 1937 |
| 2,097,597 | Pavlecka | Nov. 2, 1937 |
| 2,296,470 | Keehn | Sept. 22, 1942 |
| 2,307,080 | Schaefer | Jan. 5, 1943 |
| 2,376,854 | Saunders et al. | May 22, 1945 |
| 2,435,876 | De Swart | Feb. 10, 1948 |